United States Patent
Watarai

(10) Patent No.: US 10,363,992 B2
(45) Date of Patent: Jul. 30, 2019

(54) ELECTRIC BICYCLE COMPONENT

(71) Applicant: SHIMANO INC., Sakai (JP)

(72) Inventor: Etsuyoshi Watarai, Sakai (JP)

(73) Assignee: SHIMANO INC., Sakai (JP)

( * ) Notice: Subject to any disclaimer, the term of this patent is extended or adjusted under 35 U.S.C. 154(b) by 399 days.

(21) Appl. No.: 14/609,349

(22) Filed: Jan. 29, 2015

(65) Prior Publication Data

US 2016/0221640 A1   Aug. 4, 2016

(51) Int. Cl.
*B62M 25/08* (2006.01)
*B62M 9/122* (2010.01)
*B62M 9/132* (2010.01)
*B62J 99/00* (2009.01)

(52) U.S. Cl.
CPC ............ *B62M 25/08* (2013.01); *B62M 9/122* (2013.01); *B62M 9/132* (2013.01); *B62J 2099/0013* (2013.01)

(58) Field of Classification Search
CPC ........ B62J 2099/0013; B62J 2099/002; B62M 6/45; B62M 6/50; B62M 6/80; B62M 6/90; B62M 9/12; B62M 9/121; B62M 9/122; B62M 9/124; B62M 9/126; B62M 9/131; B62M 9/132; B62M 9/134; B62M 9/136; B62M 25/00; B62M 25/02; B62M 25/04; B62M 25/08; B62M 2025/003; B62M 2025/006; B62M 2700/008
See application file for complete search history.

(56) References Cited

U.S. PATENT DOCUMENTS

| | | | | |
|---|---|---|---|---|
| 5,798,702 A * | 8/1998 | Okamoto | ................. | B62M 6/45 180/220 |
| 6,741,045 B2 * | 5/2004 | Kitamura | ............... | B62M 25/08 318/14 |
| 7,089,100 B2 * | 8/2006 | Takeda | .................... | B62J 99/00 701/32.5 |
| 7,116,008 B2 * | 10/2006 | Kitamura | ................. | B62J 6/003 280/200 |
| 7,243,937 B2 * | 7/2007 | Ishikawa | ................ | B62M 25/08 280/259 |
| 8,162,191 B2 * | 4/2012 | Tetsuka | .................... | B62J 11/00 224/441 |
| 8,459,682 B2 * | 6/2013 | Calfee | ................... | B62M 25/08 224/427 |
| 8,651,212 B2 * | 2/2014 | Vincenz | ................ | B62H 5/001 180/205.1 |

(Continued)

FOREIGN PATENT DOCUMENTS

| | | |
|---|---|---|
| DE | 202013100453 U1 | 2/2013 |
| TW | 201412596 | 4/2014 |
| TW | 201420421 | 6/2014 |

*Primary Examiner* — Victor L MacArthur
(74) *Attorney, Agent, or Firm* — Mori & Ward, LLP

(57) ABSTRACT

An electric bicycle component comprises a wireless communication device, a rechargeable power supply device, a movable member, and a charging port. The wireless communication device is configured to wirelessly communicate with an additional bicycle component. The rechargeable power supply device is configured to supply electrical power to the wireless communication device. The movable member is configured to be actuated by the electrical power supplied from the rechargeable power supply device. The rechargeable power supply device is to be charged via the charging port.

16 Claims, 7 Drawing Sheets

(56) References Cited

U.S. PATENT DOCUMENTS

| | | | |
|---|---|---|---|
| 8,655,561 B2 | 2/2014 | Kitamura | |
| 8,770,808 B1 * | 7/2014 | Campbell | B62J 6/04 |
| | | | 362/473 |
| 2006/0186158 A1 * | 8/2006 | Ishikawa | B62J 11/00 |
| | | | 224/419 |
| 2007/0207885 A1 * | 9/2007 | Watarai | B62M 25/08 |
| | | | 474/70 |
| 2009/0170660 A1 * | 7/2009 | Miglioranza | A63B 24/00 |
| | | | 482/1 |
| 2013/0334874 A1 * | 12/2013 | Shirai | B62M 25/08 |
| | | | 307/9.1 |
| 2014/0087901 A1 * | 3/2014 | Shipman | B62M 9/132 |
| | | | 474/82 |
| 2014/0102237 A1 | 4/2014 | Jordan et al. | |
| 2014/0114538 A1 | 4/2014 | Shipman et al. | |
| 2015/0180517 A1 * | 6/2015 | Abe | G08C 17/00 |
| | | | 455/99 |
| 2015/0197308 A1 | 7/2015 | Butora et al. | |
| 2016/0152302 A1 * | 6/2016 | Nishino | B62M 25/08 |
| | | | 701/2 |
| 2016/0185421 A1 * | 6/2016 | Komatsu | B62M 25/08 |
| | | | 701/2 |

\* cited by examiner

ELECTRIC BICYCLE COMPONENT

BACKGROUND OF THE INVENTION

Field of the Invention

The present invention relates to an electric bicycle component.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycle components use electrical technology instead of or in addition to mechanical technology.

SUMMARY OF THE INVENTION

In accordance with a first aspect of the present invention, an electric bicycle component comprises a wireless communication device, a rechargeable power supply device, a movable member, and a charging port. The wireless communication device is configured to wirelessly communicate with an additional bicycle component. The rechargeable power supply device is configured to supply electrical power to the wireless communication device. The movable member is configured to be actuated by the electrical power supplied from the rechargeable power supply device. The rechargeable power supply device is to be charged via the charging port.

In accordance with a second aspect of the present invention, the electric bicycle component according to the first aspect further comprises a charging controller configured to control a charging voltage inputted via the charging port to the rechargeable power supply device.

In accordance with a third aspect of the present invention, the electric bicycle component according to the second aspect further comprises a battery holder in which the rechargeable power supply device is to be detachably provided. The rechargeable power supply device comprises a rechargeable battery configured to be provided in the battery holder.

In accordance with a fourth aspect of the present invention, the electric bicycle component according to the third aspect is configured so that the battery holder includes an electrical terminal configured to be in contact with a terminal of the rechargeable battery in a state where the rechargeable battery is provided in the battery holder.

In accordance with a fifth aspect of the present invention, the electric bicycle component according to the first aspect is configured so that the wireless communication device includes a wireless receiver configured to wirelessly receive a signal from the additional bicycle component. The rechargeable power supply device is configured to supply the electrical power to the wireless receiver.

In accordance with a sixth aspect of the present invention, the electric bicycle component according to the first aspect further comprises an actuator configured to convert the electrical power to an actuating force. The rechargeable power supply device is configured to supply the electrical power to the actuator.

In accordance with a seventh aspect of the present invention, the electric bicycle component according to the sixth aspect is configured so that the movable member is configured to be actuated by the actuating force from the actuator.

In accordance with an eighth aspect of the present invention, the electric bicycle component according to the seventh aspect is configured so that the movable member includes a chain guide configured to guide a bicycle chain to change speed stages of a bicycle.

In accordance with a ninth aspect of the present invention, the electric bicycle component according to the first aspect further comprises a signal controller configured to generate a signal. The wireless communication device includes a wireless transmitter configured to wirelessly transmit the signal. The rechargeable power supply device is configured to supply the electrical power to the signal controller.

In accordance with a tenth aspect of the present invention, the electric bicycle component according to the ninth aspect is configured so that the rechargeable power supply device comprises a rechargeable battery. The signal controller is configured to generate a battery level signal indicating a battery level of the rechargeable battery. The wireless transmitter is configured to wirelessly transmit the battery level signal.

In accordance with an eleventh aspect of the present invention, the electric bicycle component according to the ninth aspect is configured so that the movable member includes a chain guide configured to guide a bicycle chain to change speed stages of a bicycle. The signal controller is configured to generate a current speed stage signal indicating a current speed stage of the bicycle. The wireless transmitter is configured to wirelessly transmit the current speed stage signal.

In accordance with a twelfth aspect of the present invention, the electric bicycle component according to the first aspect further comprises a cover member configured to cover the charging port.

In accordance with a thirteenth aspect of the present invention, the electric bicycle component according to the twelfth aspect further comprises a seal member configured to be attached to at least one of the cover member and the charging port.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
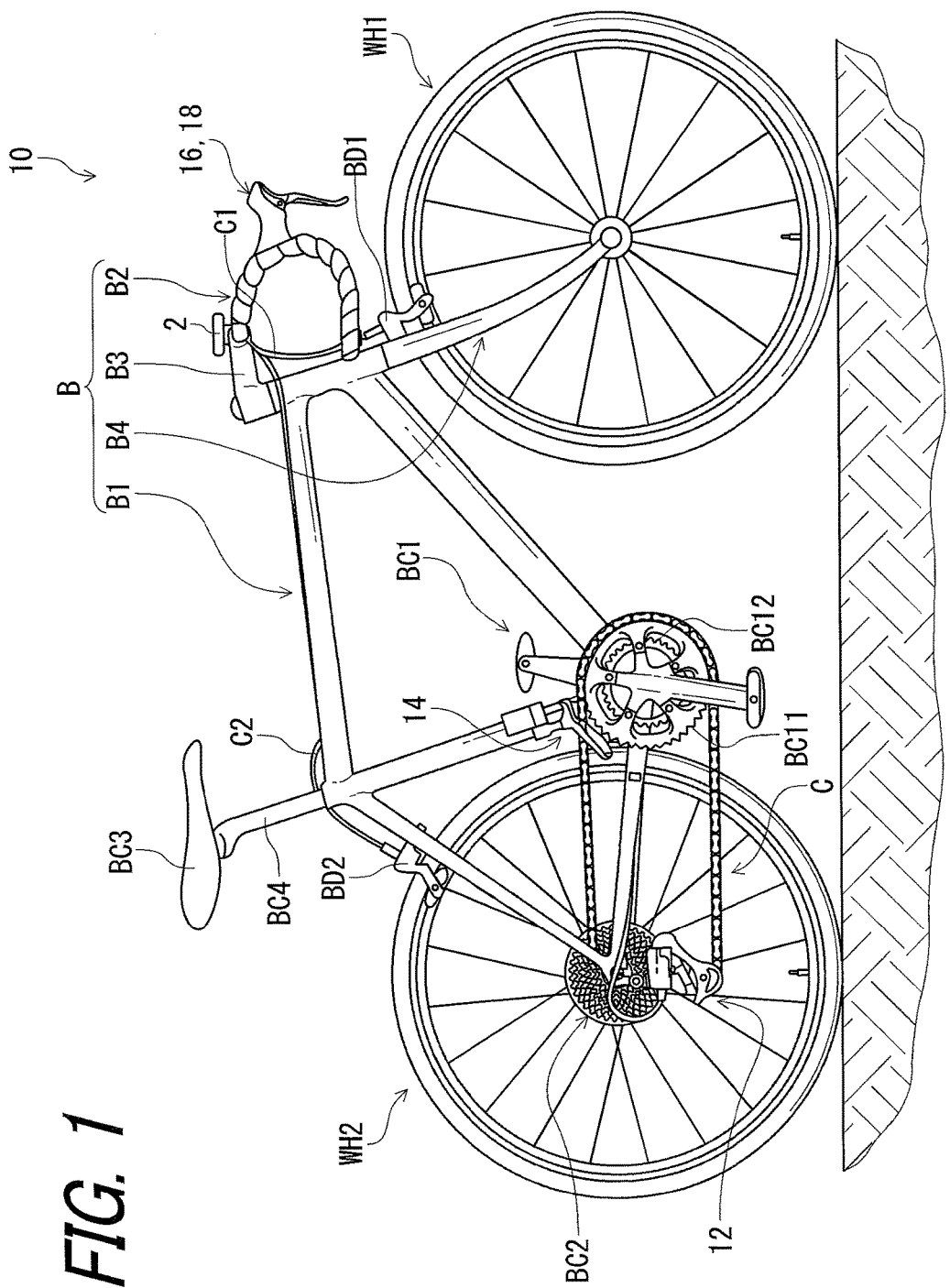
FIG. 1 is a side elevational view of a bicycle equipped with an electric bicycle component in accordance with an embodiment.

The embodiments will now be described with reference to the accompanying drawings, wherein like reference numerals designate corresponding or identical elements throughout the various drawings.

Referring initially to FIG. 1, a bicycle 10 is illustrated that is equipped with electric bicycle components 12 and 14 in accordance with an embodiment. While the bicycle 10 is illustrated as a road bike, at least one of the electric bicycle components 12 and 14 can be applied to mountain bikes or any type of bicycle.

As seen in FIG. 1, the bicycle 10 includes a bicycle body B, a crank assembly BC1, a rear sprocket assembly BC2, a saddle BC3, a seatpost BC4, and a bicycle chain C. The bicycle body B includes a bicycle frame B1, a handlebar B2, a stem B3, and a front fork B4. The handlebar B2 is coupled to the front fork B4 via the stem B3. A cycle computer 2 is attached to the stem B3. The bicycle chain C engages with chain wheels BC11 and BC12 of the crank assembly BC1 and the rear sprocket assembly BC2. In the illustrated embodiment, the crank assembly BC1 has two speed stages, and the rear sprocket assembly BC2 has eleven speed stages. The saddle BC3 is attached to the bicycle body B via the seatpost BC4.

The bicycle 10 includes brake devices BD1 and BD2 and additional bicycle components 16 and 18. In the illustrated embodiment, the additional bicycle component 16 is an operating device via which the brake device BD1 is operated. The additional bicycle component 18 is an operating device via which the brake device BD2 is operated. The additional bicycle components 16 and 18 are configured to be mounted to the bicycle body B. While each of the additional bicycle components 16 and 18 is mounted to the handlebar B2 in the illustrated embodiment, the additional bicycle components 16 and 18 can be mounted to other parts of the bicycle body B if needed and/or desired.

In the illustrated embodiment, each of the electric bicycle components 12 and 14 is a bicycle transmission configured to change speed stages. More specifically, the electric bicycle component 12 is a rear derailleur configured to shift the bicycle chain C between sprockets of the rear sprocket assembly BC2. The electric bicycle component 14 is a front derailleur configured to shift the bicycle chain C between the chain wheels BC11 and BC12 of the crank assembly BC1.

In the illustrated embodiment, the additional bicycle component 16 is an operating device via which the electric bicycle component 12 is operated in addition to the brake device BD1. The additional bicycle component 18 is an operating device via which the electric bicycle component 14 is operated in addition to the brake device BD2. The electric bicycle component 12 is operated via the additional bicycle component 16 by using wireless communication technology. The electric bicycle component 14 is operated via the additional bicycle component 18 by using the wireless communication technology. The electric bicycle components 12 and 14 can be operated via one of the additional bicycle components 16 and 18 by using the wireless communication technology if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle BC3 of the bicycle 10 with facing the handlebar B2. Accordingly, these terms, as utilized to describe bicycle components, should be interpreted relative to the bicycle 10 equipped with the bicycle components as used in an upright riding position on a horizontal surface.

Figure 2:
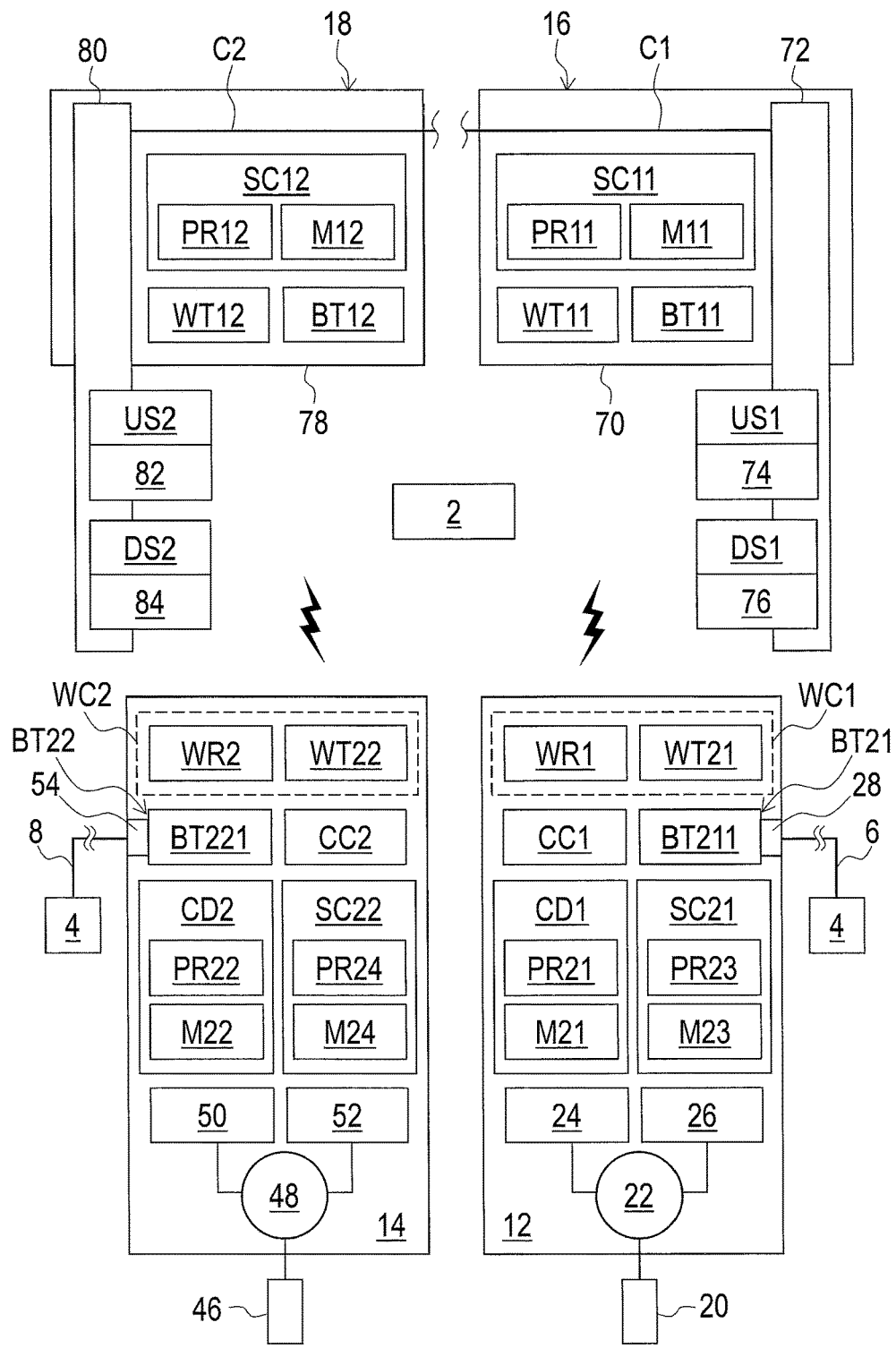
FIG. 2 is a block diagram of the electric bicycle component in accordance with the embodiment.

As seen in FIG. 2, the electric bicycle component 12 comprises a wireless communication device WC1 and a rechargeable power supply device BT21. The wireless communication device WC1 is configured to wirelessly communicate with the additional bicycle component 16. The rechargeable power supply device BT21 is configured to supply electrical power to the wireless communication device WC1. The rechargeable power supply device BT21 is electrically connected to the wireless communication device WC1.

As seen in FIG. 2, the wireless communication device WC1 includes a wireless receiver WR1 configured to wirelessly receive a signal from the additional bicycle component 16. The rechargeable power supply device BT21 is configured to supply the electrical power to the wireless receiver WR1. The rechargeable power supply device BT21 is electrically connected to the wireless receiver WR1.

Figure 3:
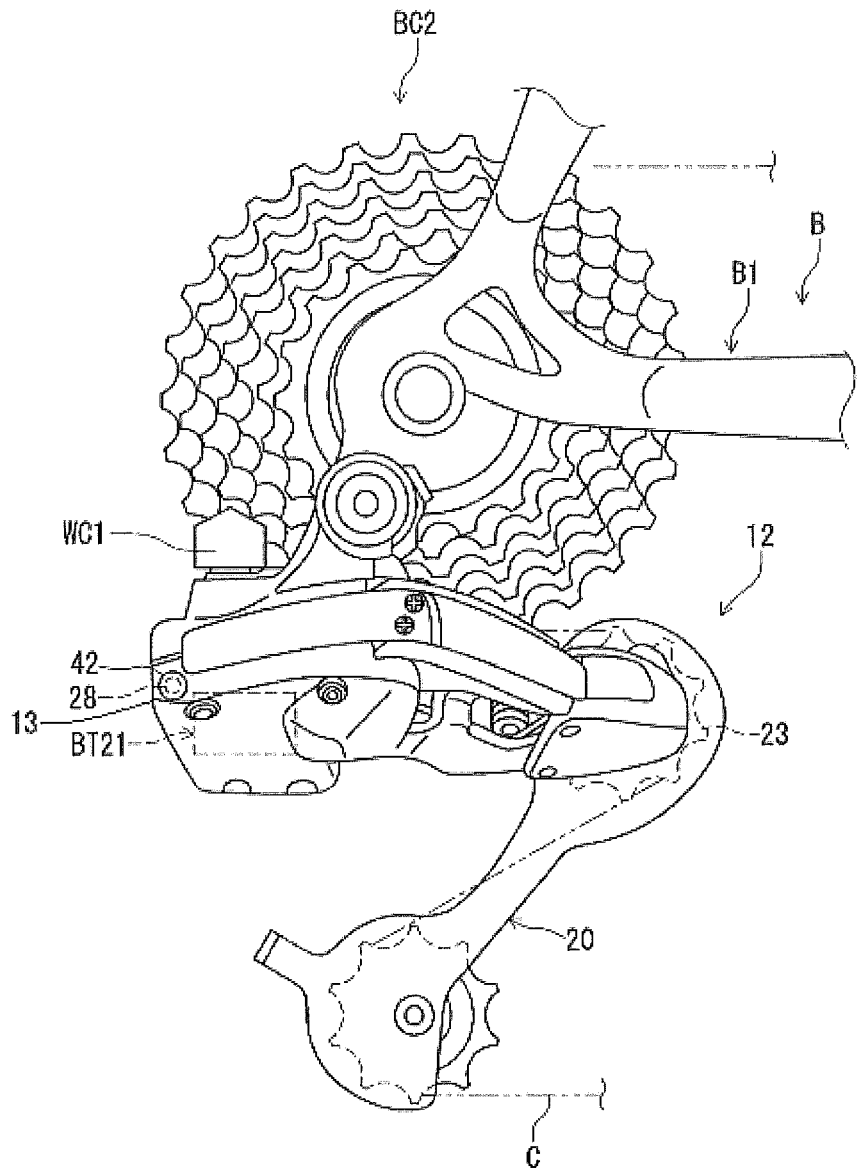
FIG. 3 is a side elevational view of the electric bicycle component illustrated in FIG. 2.

As seen in FIGS. 2 and 3, the electric bicycle component 12 comprises a movable member 20. The movable member 20 is configured to be actuated by the electrical power supplied from the rechargeable power supply device BT21 (FIG. 2).

As seen in FIG. 2, the electric bicycle component 12 further comprises an actuator 22 configured to convert the electrical power to an actuating force. The rechargeable power supply device BT21 is configured to supply the electrical power to the actuator 22. The movable member 20 is configured to be actuated by the actuating force from the actuator 22. The movable member 20 includes a chain guide 23 configured to guide the bicycle chain C to change speed stages of the bicycle 10. Possible examples of the actuator 22 include a direct current motor and a stepper motor.

The electric bicycle component 12 further includes a position sensor 24, a driver unit 26, and a control device CD1. The position sensor 24 is configured to sense a current position of the actuator 22 for determining a current speed stage of the electric bicycle component 12. Possible examples of the position sensor 24 include a potentiometer, a rotary encoder, and a hall sensor. The driver unit 26 is configured to control the actuator 22 based on the current position of the actuator 22 and driving signals from the control device CD1. The control device CD1 is configured to generate the driving signals based on shift signals from the additional bicycle component 16. In the illustrated embodiment, the rechargeable power supply device BT21 is also configured to supply the electrical power to the actuator 22, the position sensor 24, and the driver unit 26. The rechargeable power supply device BT21 is electrically connected to the electrical power to the actuator 22, the position sensor 24, and the driver unit 26.

As seen in FIG. 2, the control device CD1 is constituted as a microcomputer and includes a processor PR21 and a memory M21. The processor PR21 includes a central processing unit (CPU). The memory M21 includes a read only memory (ROM) and a random access memory (RAM). For example, a program stored in the memory M21 is read into the processor PR21, and thereby functions of the control device CD1 are performed.

As seen in FIGS. 2 and 3, the electric bicycle component 12 comprises a charging port 28 via which the rechargeable power supply device BT21 is to be charged. In the illustrated embodiment, the rechargeable power supply device BT21 comprises a rechargeable battery BT211. The rechargeable power supply device BT21 is configured to be charged via the charging port 28.

As seen in FIG. 2, the charging port 28 is configured to be removably connected with a charging cable 6 via which the electrical power is transmitted from an external power source 4 such as an alternating-current (AC) power source (e.g., 100V AC) for general home use. For example, the charging port 28 is configured to receive the electrical power such as AC power from the external power source 4 via the charging cable 6.

While the rechargeable power supply device BT21 comprises the rechargeable battery BT211 in the illustrated embodiment, the rechargeable power supply device BT21 can comprise another device instead of or in addition to the rechargeable battery BT211 if needed and/or desired. Furthermore, the charging port 28 can be configured to receive direct-current (DC) power from the external power source 4 if needed and/or desired.

As seen in FIG. 2, the electric bicycle component 12 further comprises a charging controller CC1 configured to control a charging voltage inputted via the charging port 28 to the rechargeable power supply device BT21. While the charging controller CC1 is provided in the electric bicycle component 12 in the illustrated embodiment, the charging controller CC1 can be provided outside the electric bicycle component 12 if needed and/or desired. In such an embodiment, for example, the charging cable 6 includes an AC/DC adapter.

The electric bicycle component 12 further comprises a signal controller SC21 configured to generate a signal. The wireless communication device WC1 includes a wireless transmitter WT21 configured to wirelessly transmit the signal. The rechargeable power supply device BT21 is configured to supply the electrical power to the signal controller SC21. The rechargeable power supply device BT21 is electrically connected to the signal controller SC21.

In the illustrated embodiment, the signal controller SC21 is configured to generate a battery level signal indicating a battery level of the rechargeable battery BT211. The wireless transmitter WT21 is configured to wirelessly transmit the battery level signal. In the illustrated embodiment, the wireless transmitter WT21 is configured to wirelessly transmit the battery level signal to the cycle computer 2, for example. The charging controller CC1 is configured to sense the battery level of the rechargeable battery BT211. The signal controller SC21 is configured to generate the battery level signal based on the battery level sensed by the charging controller CC1.

The signal controller SC21 is configured to generate a current speed stage signal indicating a current speed stage of the bicycle 10. The wireless transmitter WT21 is configured to wirelessly transmit the current speed stage signal. In the illustrated embodiment, the signal controller SC21 is configured to generate the current speed stage signal indicating the current speed stage of the electric bicycle component 12. The signal controller SC21 is configured to generate the current speed stage signal based on the current position of the actuator 22 sensed by the position sensor 24. The wireless transmitter WT21 is configured to wirelessly transmit the current speed stage signal to the additional bicycle component 16 and/or the cycle computer 2.

As seen in FIG. 2, the signal controller SC21 is constituted as a microcomputer and includes a processor PR23 and a memory M23. The processor PR23 includes a CPU. The memory M23 includes a ROM and a RAM. For example, a program stored in the memory M23 is read into the processor PR23, and thereby functions of the signal controller SC21 are performed.

Figure 4:
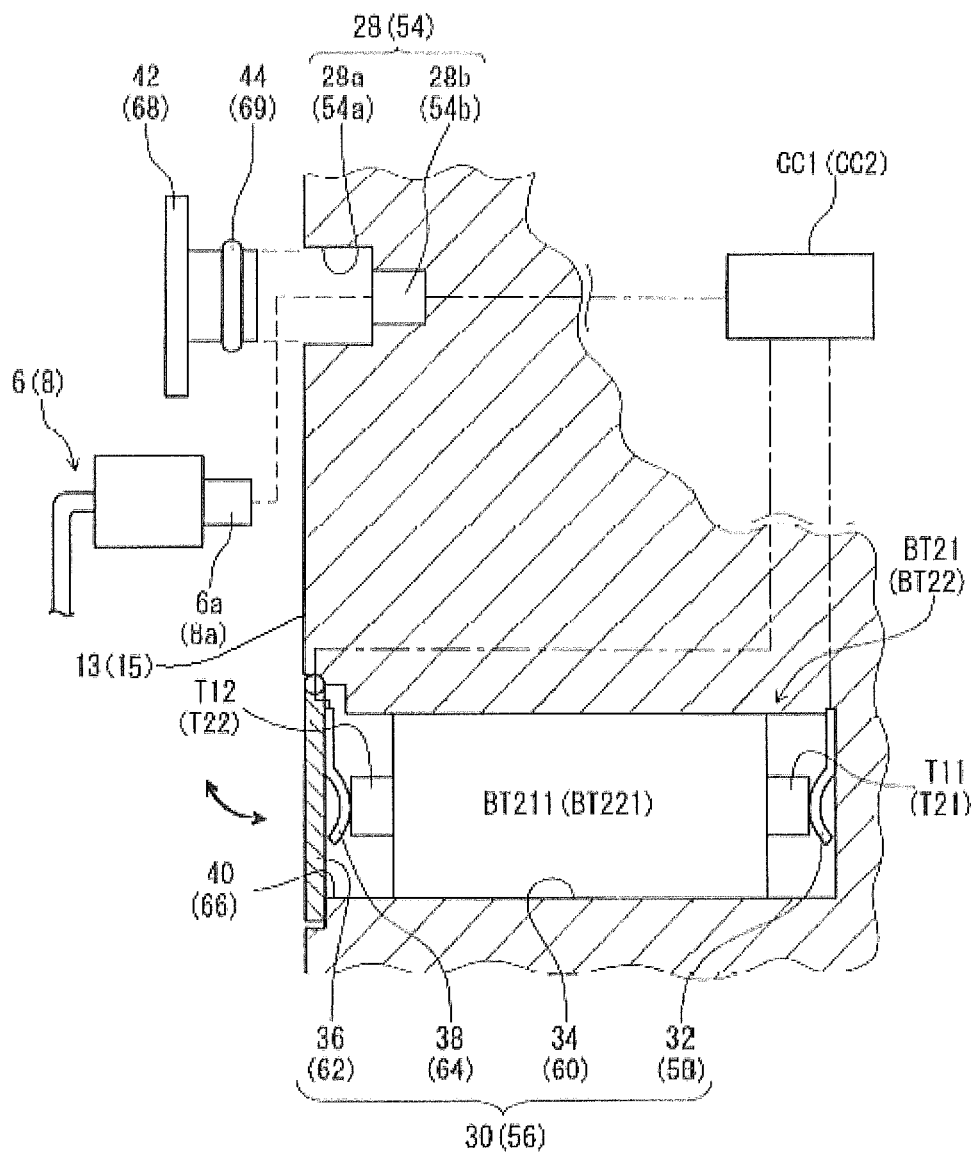
FIG. 4 is a partial cross-sectional view of the electric bicycle component illustrated in FIG. 2.

As seen in FIG. 4, the electric bicycle component 12 further comprises a component body 13 and a battery holder 30 in which the rechargeable power supply device BT21 is to be detachably provided. The rechargeable battery BT211 is configured to be provided in the battery holder 30. The battery holder 30 includes an electrical terminal 32 configured to be in contact with a terminal T11 of the rechargeable battery BT211 in a state where the rechargeable battery BT211 is provided in the battery holder 30.

In the illustrated embodiment, the battery holder 30 includes an internal space 34, a lid 36, and an additional electrical terminal 38. The rechargeable power supply device BT21 is provided in the internal space 34. The internal space 34 includes an opening 40. The internal space 34 is configured to be in communication with an outside of the electric bicycle component 12 via the opening 40. The lid 36 is configured to cover the opening 40 of the internal space 34. The additional electrical terminal 38 is secured to the lid 36. The electrical terminal 32 and the additional electrical terminal 38 are in contact with the terminal T11 and the additional terminal T12 of the rechargeable power supply device BT21 in a closing state where the lid 36 closes the opening 40. The battery holder 30 includes a lock (not shown) configured to keep and release the closing state of the lid 36. A sealing element (not shown) can be provided between the lid 36 and the opening 40.

As seen in FIG. 4, the electric bicycle component 12 further comprises a cover member 42 configured to cover the charging port 28. The cover member 42 is configured to be detachably attached to the charging port 28 to reduce the entrance of contamination such as dust and water into the charging port 28. The charging port 28 includes a hole 28a and a charging terminal 28b. The charging terminal 28b is provided in the hole 28a and is electrically connected to the charging controller CC1. The charging terminal 28b is configured to be electrically connected with an electrical terminal 6a of the charging cable 6. The cover member 42 is configured to cover the hole 28a of the charging port 28. The cover member 42 is configured to be partly provided in the hole 28a. The cover member 42 can be omitted from the electric bicycle component 12 if needed and/or desired.

As seen in FIG. 4, the electric bicycle component 12 further comprises a seal member 44 configured to be attached to at least one of the cover member 42 and the charging port 28. While the seal member 44 is attached to the cover member 42 in the illustrated embodiment, the seal member 44 can be attached to the charging port 28 if needed and/or desired. Furthermore, seal members can be respectively attached to the charging port 28 and the cover member 42 if needed and/or desired. The seal member 44 can be omitted from the electric bicycle component 12 if needed and/or desired.

As seen in FIG. 2, the electric bicycle component 14 comprises a wireless communication device WC2 and a rechargeable power supply device BT22. The wireless communication device WC2 is configured to wirelessly communicate with the additional bicycle component 18. The rechargeable power supply device BT22 is configured to supply electrical power to the wireless communication device WC2. The rechargeable power supply device BT22 is electrically connected to the wireless communication device WC2.

As seen in FIG. 2, the wireless communication device WC2 includes a wireless receiver WR2 configured to wirelessly receive a signal from the additional bicycle component 18. The rechargeable power supply device BT22 is configured to supply the electrical power to the wireless receiver WR2. The rechargeable power supply device BT22 is electrically connected to the wireless receiver WR2.

Figure 5:
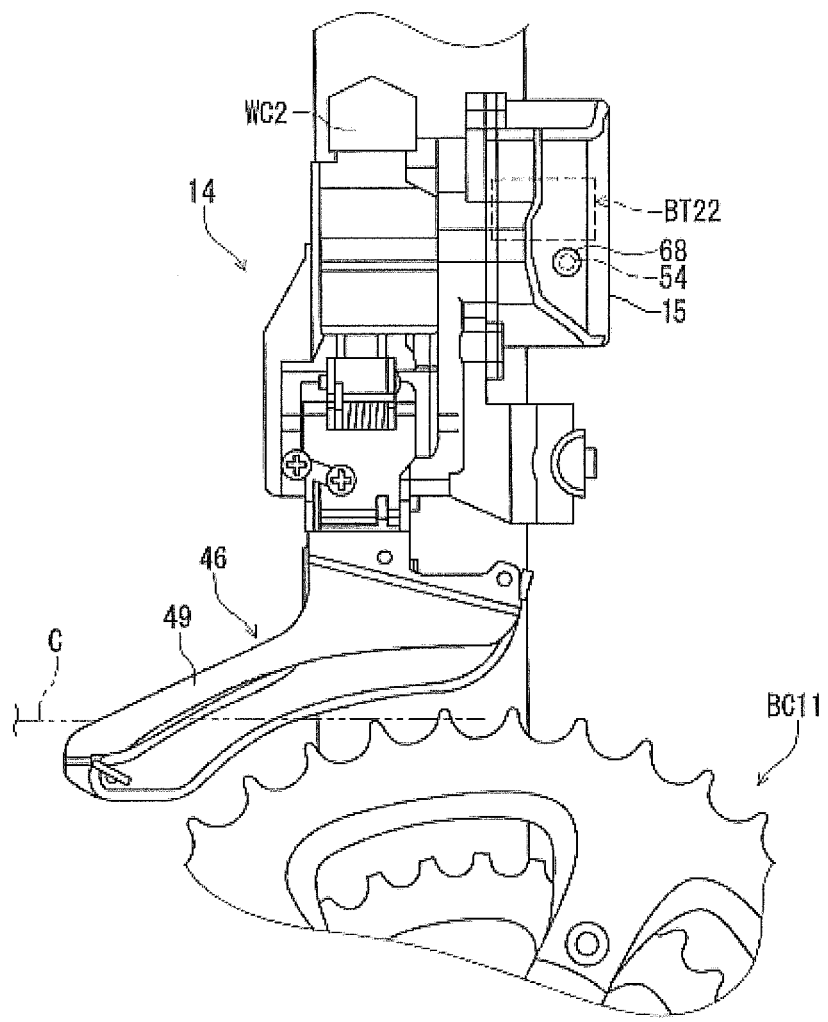
FIG. 5 is a side elevational view of another electric bicycle component illustrated in FIG. 2.

As seen in FIGS. 2 and 5, the electric bicycle component 14 comprises a movable member 46. The movable member 46 is configured to be actuated by the electrical power supplied from the rechargeable power supply device BT22 (FIG. 2).

As seen in FIG. 2, the electric bicycle component 14 further comprises an actuator 48 configured to convert the electrical power to an actuating force. The rechargeable power supply device BT22 is configured to supply the electrical power to the actuator 48. The movable member 46 is configured to be actuated by the actuating force from the actuator 48. The movable member 46 includes a chain guide 49 configured to guide a bicycle chain to change speed stages of a bicycle. Possible examples of the actuator 48 include a direct current motor and a stepper motor.

The electric bicycle component 14 further includes a position sensor 50, a driver unit 52, and a control device CD2. The position sensor 50 is configured to sense a current position of the actuator 48 for determining a current speed stage of the electric bicycle component 14. Possible examples of the position sensor 50 include a potentiometer, a rotary encoder, and a hall sensor. The driver unit 52 is configured to control the actuator 48 based on the current position of the actuator 48 and driving signals from the control device CD2. The control device CD2 is configured to generate the driving signals based on the shift signals from the additional bicycle component 18. In the illustrated embodiment, the rechargeable power supply device BT22 is also configured to supply the electrical power to the actuator 48, the position sensor 50, and the driver unit 52. The rechargeable power supply device BT22 is electrically connected to the actuator 48, the position sensor 50, and the driver unit 52.

As seen in FIG. 2, the control device CD2 is constituted as a microcomputer and includes a processor PR22 and a memory M22. The processor PR22 includes a CPU. The memory M22 includes a ROM and a RAM. For example, a program stored in the memory M22 is read into the processor PR22, and thereby functions of the control device CD2 are performed.

As seen in FIGS. 2 and 5, the electric bicycle component 14 comprises a charging port 54 via which the rechargeable power supply device BT22 is to be charged. In the illustrated embodiment, the rechargeable power supply device BT22 comprises a rechargeable battery BT221. The rechargeable power supply device BT22 is configured to be charged via the charging port 54.

As seen in FIG. 2, the charging port 54 is configured to be removably connected with a charging cable 8 via which the electrical power is transmitted from the external power source 4. For example, the charging port 54 is configured to receive the electrical power such as AC power from the external power source 4 via the charging cable 8.

While the rechargeable power supply device BT22 comprises the rechargeable battery BT221 in the illustrated embodiment, the rechargeable power supply device BT22 can comprise another device instead of or in addition to the rechargeable battery BT221 if needed and/or desired. Furthermore, the charging port 54 can be configured to receive DC power from the external power source 4 if needed and/or desired.

As seen in FIG. 2, the electric bicycle component 14 further comprises a charging controller CC2 configured to control a charging voltage inputted via the charging port 54 to the rechargeable power supply device BT22. While the charging controller CC2 is provided in the electric bicycle component 14 in the illustrated embodiment, the charging controller CC2 can be provided outside the electric bicycle component 14 if needed and/or desired. In such an embodiment, for example, the charging cable 8 includes an AC/DC adapter.

The electric bicycle component 14 further comprises a signal controller SC22 configured to generate a signal. The wireless communication device WC2 includes a wireless transmitter WT22 configured to wirelessly transmit the signal. The rechargeable power supply device BT22 is configured to supply the electrical power to the signal controller SC22. The rechargeable power supply device BT22 is electrically connected to the signal controller SC22.

In the illustrated embodiment, the signal controller SC22 is configured to generate a battery level signal indicating a battery level of the rechargeable battery BT221. The wireless transmitter WT22 is configured to wirelessly transmit the battery level signal. In the illustrated embodiment, the wireless transmitter WT22 is configured to wirelessly transmit the battery level signal to the cycle computer 2, for example. The charging controller CC2 is configured to sense the battery level of the rechargeable battery BT221. The signal controller SC22 is configured to generate the battery level signal based on the battery level sensed by the charging controller CC2.

The signal controller SC22 is configured to generate a current speed stage signal indicating a current speed stage of the bicycle 10. The wireless transmitter WT22 is configured to wirelessly transmit the current speed stage signal. In the illustrated embodiment, the signal controller SC22 is configured to generate the current speed stage signal indicating the current speed stage of the electric bicycle component 14. The signal controller SC22 is configured to generate the current speed stage signal based on the current position of the actuator 48 sensed by the position sensor 50. The wireless transmitter WT22 is configured to wirelessly transmit the current speed stage signal to the additional bicycle component 18 and/or the cycle computer 2.

As seen in FIG. 2, the signal controller SC22 is constituted as a microcomputer and includes a processor PR24 and a memory M24. The processor PR24 includes a CPU. The memory M24 includes a ROM and a RAM. For example, a program stored in the memory M24 is read into the processor PR24, and thereby functions of the signal controller SC22 are performed.

As seen in FIG. 4, the electric bicycle component 14 further comprises a component body 15 and a battery holder 56 in which the rechargeable power supply device BT22 is to be detachably provided. The rechargeable battery BT221 is configured to be provided in the battery holder 56. The battery holder 56 includes an electrical terminal 58 configured to be in contact with a terminal T21 of the rechargeable battery BT221 in a state where the rechargeable battery BT221 is provided in the battery holder 56.

In the illustrated embodiment, the battery holder 56 includes an internal space 60, a lid 62, and an additional electrical terminal 64. The rechargeable power supply device BT22 is provided in the internal space 60. The internal space 60 includes an opening 66. The internal space 60 is configured to be in communication with an outside of the electric bicycle component 14 via the opening 66. The lid 62 is configured to cover the opening 66 of the internal space 60. The additional electrical terminal 64 is secured to the lid 62. The electrical terminal 58 and the additional electrical terminal 64 are in contact with the terminal T21 and the additional terminal T22 of the rechargeable power supply device BT22 in a closing state where the lid 62 closes the opening 66. The battery holder 56 includes a lock (not shown) configured to keep and release the closing state of the lid 62. A sealing element (not shown) can be provided between the lid 62 and the opening 66.

As seen in FIG. 4, the electric bicycle component 14 further comprises a cover member 68 configured to cover the charging port 54. The cover member 68 is configured to be detachably attached to the charging port 54 to reduce the entrance of contamination such as dust and water into the charging port 54. The charging port 54 includes a hole 54a and a charging terminal 54b. The charging terminal 54b is provided in the hole 54a and is electrically connected to the charging controller CC2. The charging terminal 54b is configured to be electrically connected with an electrical terminal 8a of the charging cable 6. The cover member 68 is configured to cover the hole 54a of the charging port 54. The cover member 68 is configured to be partly provided in the hole 54a. The cover member 68 can be omitted from the electric bicycle component 14 if needed and/or desired.

As seen in FIG. 4, the electric bicycle component 14 further comprises a seal member 69 configured to be attached to at least one of the cover member 68 and the charging port 54. While the seal member 69 is attached to the cover member 68 in the illustrated embodiment, the seal member 69 can be attached to the charging port 28 if needed and/or desired. Furthermore, seal members can be respectively attached to the charging port 28 and the cover member 68 if needed and/or desired. The seal member 69 can be omitted from the electric bicycle component 14 if needed and/or desired.

Figure 6:
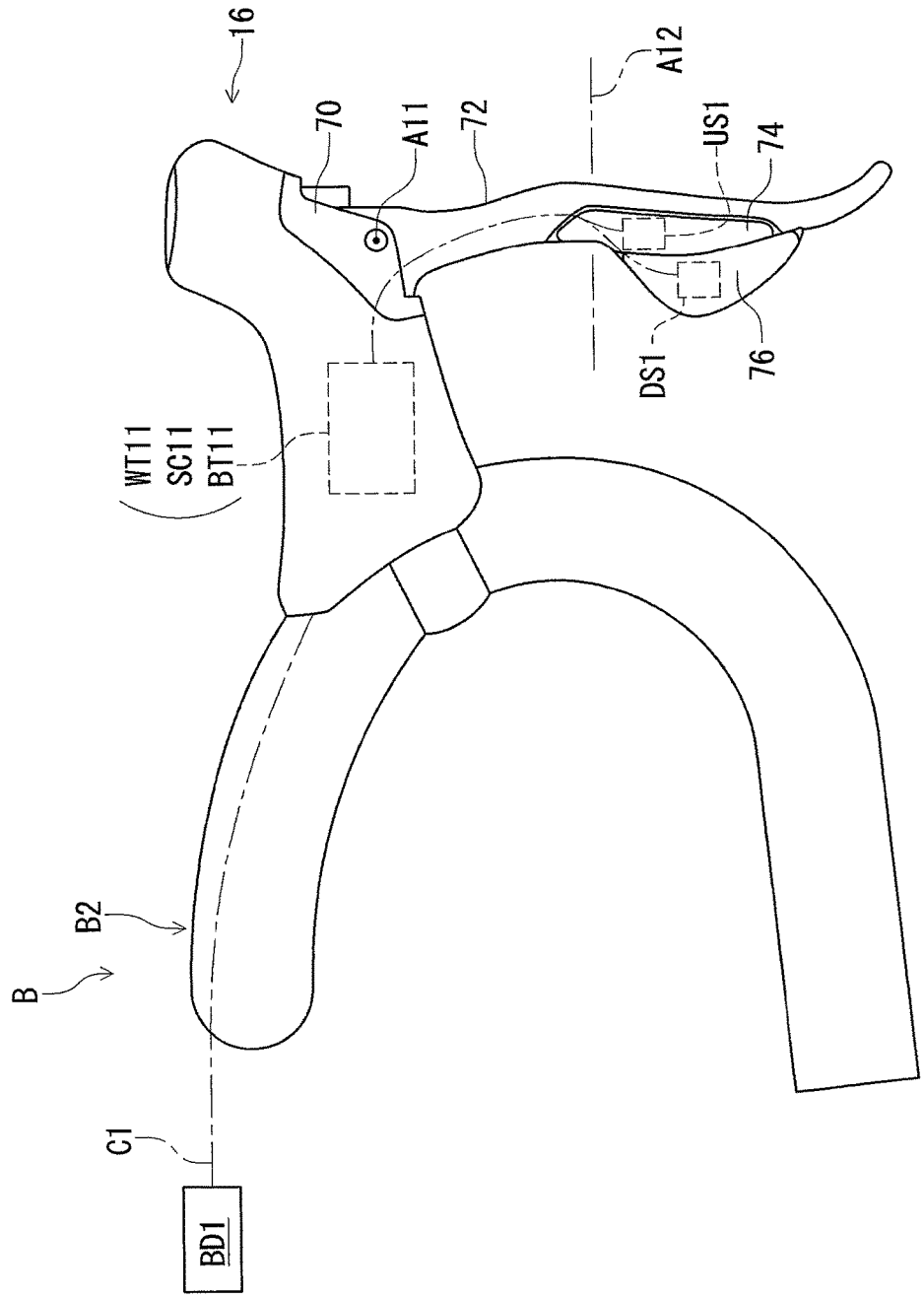
FIG. 6 is a right side elevational view of an additional bicycle component illustrated in FIG. 2.

As seen in FIGS. 2 and 6, the additional bicycle component 16 includes a shift operating switch US1, a shift operating switch DS1, an operating signal controller SC11, and an operating wireless transmitter WT11. The shift operating switches US1 and DS1 are electrically connected to the operating signal controller SC11. In the illustrated embodiment, the shift operating switch US1 is configured to receive the input shift operation (e.g., an input upshift operation) from the user. The shift operating switch DS1 is configured to receive the input shift operation (e.g., an input downshift operation) from the user. The operating signal controller SC11 is configured to detect each of the input upshift operation and the input downshift operation. The shift operating switch US1 can be also referred to as an upshift operating switch US1. The shift operating switch DS1 can be also referred to as a downshift operating switch DS1.

The operating signal controller SC11 is configured to generate a shift signal in response to the input shift operation of the shift operating switch US1. The operating signal controller SC11 is configured to generate a shift signal in response to the input shift operation of the shift operating switch DS1. In the illustrated embodiment, the operating signal controller SC11 is configured to generate an upshift signal in response to the input upshift operation of the shift operating switch US1. The operating signal controller SC11 is configured to generate a downshift signal in response to the input downshift operation of the shift operating switch DS1.

As seen in FIG. 2, the operating wireless transmitter WT11 is configured to wirelessly transmit the upshift signal and the downshift signal to the wireless receiver WR1 of the electric bicycle component 12. For example, the operating wireless transmitter WT11 is configured to superimpose the shift signal on carrier wave using a predetermined wireless communication protocol to generate wireless signals indicative of the input shift operation. The wireless receiver WR1 of the electric bicycle component 12 is configured to establish the wireless communication with the operating wireless transmitter WT11 in a pairing mode, for example.

The operating signal controller SC11 is constituted as a microcomputer and includes a processor PR11 and a memory M11. The processor PR11 includes a CPU. The memory M11 includes a ROM and a RAM. For example, a program stored in the memory M11 is read into the processor PR11, and thereby functions of the operating signal controller SC11 are performed.

As seen in FIG. 6, the additional bicycle component 16 includes a base member 70 and a lever 72. The base member 70 is configured to be detachably attached to the bicycle body B. The lever 72 is pivotally mounted to the base member 70 about a pivot axis A11. The lever 72 is operatively connected to the brake device BD1 via a control cable C1. In the illustrated embodiment, the operating signal controller SC11 and the operating wireless transmitter WT11 are mounted to the base member 70. While the base member 70 is detachably attached to the handlebar B2 in the illustrated embodiment, the base member 70 can be attached to other part of the bicycle body B if needed and/or desired.

As seen in FIG. 6, the shift operating switch US1 and the shift operating switch DS1 are mounted on the lever 72. The additional bicycle component 16 includes an upshift operating member 74 and a downshift operating member 76. The upshift operating member 74 is configured to be operated by the user and is operatively coupled to the shift operating switch US1. The downshift operating member 76 is configured to be operated by the user and is operatively coupled to the shift operating switch DS1. The upshift operating member 74 and the downshift operating member 76 are movably mounted on the lever 72. For example, the upshift operating member 74 and the downshift operating member 76 are pivotally mounted on the lever 72 about a pivot axis A12 which is non-parallel to the pivot axis A11. The shift operating switch US1 is configured to be turned on (activated) in response to the input shift operation from the upshift operating member 74. The shift operating switch DS1 is configured to be turned on (activated) in response to the input shift operation from the downshift operating member 76.

Figure 7:
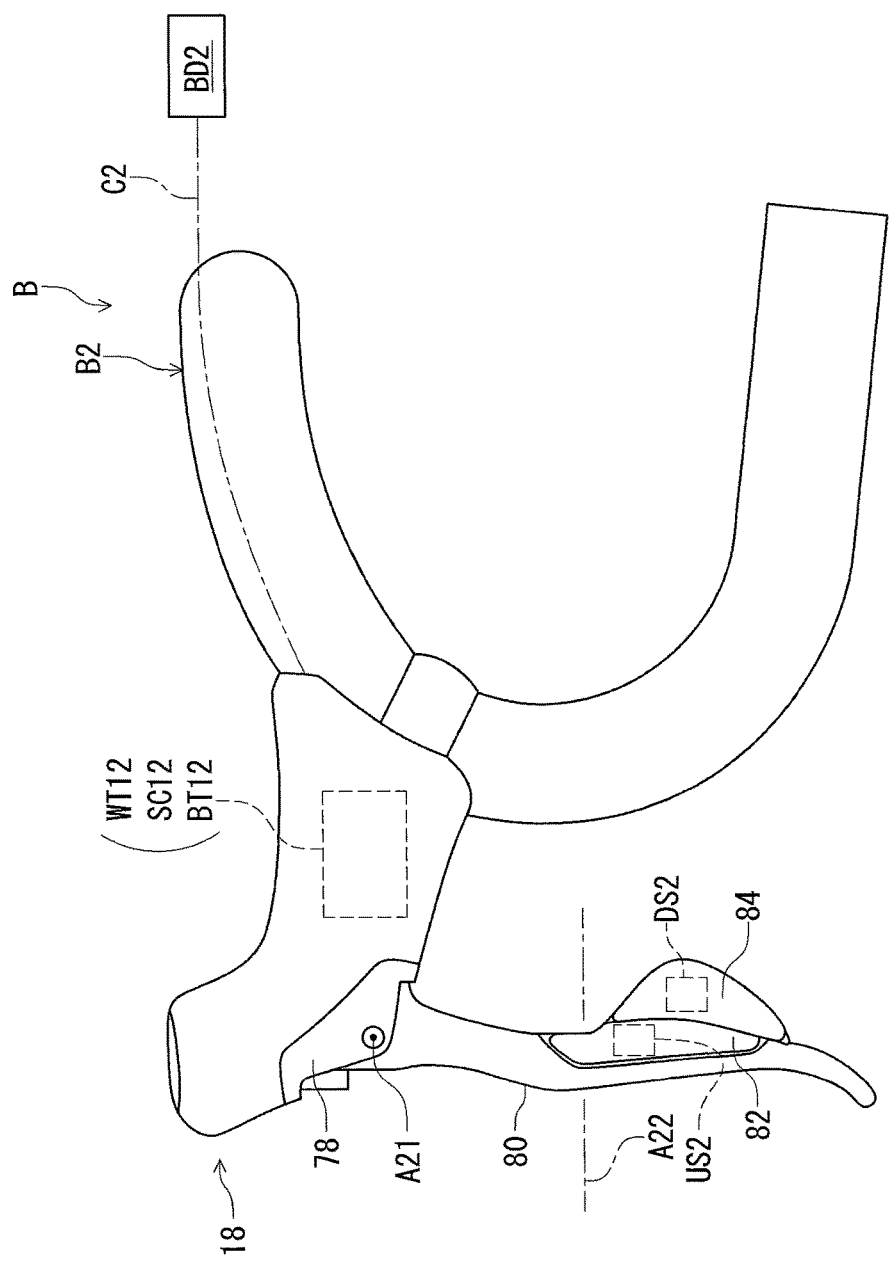
FIG. 7 is a left side elevational view of another additional bicycle component illustrated in FIG. 2.

As seen in FIGS. 2 and 7, the additional bicycle component 18 includes a shift operating switch US2, a shift operating switch DS2, an operating signal controller SC12, and an operating wireless transmitter WT12. The shift operating switches US2 and DS2 are electrically connected to the operating signal controller SC12. In the illustrated embodiment, the shift operating switch US2 is configured to receive the input shift operation (e.g., an input upshift operation) from the user. The shift operating switch DS2 is configured to receive the input shift operation (e.g., an input downshift operation) from the user. The operating signal controller SC12 is configured to detect each of the input upshift operation and the input downshift operation. The shift operating switch US2 can be also referred to as an upshift operating switch US2. The shift operating switch DS2 can be also referred to as a downshift operating switch DS2.

The operating signal controller SC12 is configured to generate a shift signal in response to the input shift operation of the shift operating switch US2. The operating signal controller SC12 is configured to generate a shift signal in response to the input shift operation of the shift operating switch DS2. In the illustrated embodiment, the operating signal controller SC12 is configured to generate an upshift signal in response to the input upshift operation of the shift operating switch US2. The operating signal controller SC12 is configured to generate a downshift signal in response to the input downshift operation of the shift operating switch DS2.

As seen in FIG. 2, the operating wireless transmitter WT12 is configured to wirelessly transmit the upshift signal and the downshift signal to the wireless receiver WR2 of the electric bicycle component 12. For example, the operating wireless transmitter WT12 is configured to superimpose the shift signal on carrier wave using a predetermined wireless communication protocol to generate wireless signals indicative of the input shift operation. The wireless receiver WR2 of the electric bicycle component 12 is configured to establish the wireless communication with the operating wireless transmitter WT12 in a pairing mode, for example.

The operating signal controller SC12 is constituted as a microcomputer and includes a processor PR12 and a memory M12. The processor PR12 includes a CPU. The memory M12 includes a ROM and a RAM. For example, a program stored in the memory M12 is read into the processor PR12, and thereby functions of the operating signal controller SC12 are performed.

As seen in FIG. 7, the additional bicycle component 18 includes a base member 78 and a lever 80. The base member 78 is configured to be detachably attached to the bicycle body B. The lever 80 is pivotally mounted to the base member 78 about a pivot axis A21. The lever 80 is operatively connected to the brake device BD1 via a control cable C1. In the illustrated embodiment, the operating signal controller SC12 and the operating wireless transmitter WT12 are mounted to the base member 78. While the base member 78 is detachably attached to the handlebar B2 in the illustrated embodiment, the base member 78 can be attached to other part of the bicycle body B if needed and/or desired.

As seen in FIG. 7, the shift operating switch US2 and the shift operating switch DS2 are mounted on the lever 80. The additional bicycle component 18 includes an upshift operating member 82 and a downshift operating member 84. The upshift operating member 82 is configured to be operated by the user and is operatively coupled to the shift operating switch US2. The downshift operating member 84 is configured to be operated by the user and is operatively coupled to the shift operating switch DS2. The upshift operating member 82 and the downshift operating member 84 are movably mounted on the lever 80. For example, the upshift operating member 82 and the downshift operating member 84 are pivotally mounted on the lever 80 about a pivot axis A22 which is non-parallel to the pivot axis A21. The shift operating switch US2 is configured to be turned on (activated) in response to the input shift operation from the upshift operating member 82. The shift operating switch DS2 is configured to be turned on (activated) in response to the input shift operation from the downshift operating member 84.

Since the electric bicycle component 12 comprises the charging port 28, the rechargeable power supply device BT21 can be charged via the charging port 28. Accordingly, it is possible to charge the rechargeable power supply device BT21 by using the external power source 4 in a mounting state where the electric bicycle component 12 is mounted on the bicycle body B.

Similarly, since the electric bicycle component 14 comprises the charging port 54, the rechargeable power supply device BT22 can be charged via the charging port 54. Accordingly, it is possible to charge the rechargeable power supply device BT22 by using the external power source 4 in a mounting state where the electric bicycle component 14 is mounted on the bicycle body B.

In the illustrated embodiment, the charging ports 28 and 54 are provided in the electric bicycle components 12 and 14. However, such charging ports can be provided in the additional bicycle components 16 and 18 if needed and/or desired.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. An electric bicycle component comprising:
a wireless communication device configured to wirelessly communicate with an additional bicycle component;
a rechargeable power supply device configured to supply electrical power to the wireless communication device;
a movable member configured to be actuated by the electrical power supplied from the rechargeable power supply device;
a component body configured to be mounted to a bicycle body, the component body having an internal space that entirely houses the rechargeable power supply device, the component body having a charging port via which the rechargeable power supply device is to be charged when the rechargeable power device is housed in the internal space, the charging port including a hole provided on an outer peripheral surface of the component body when the electric bicycle component is in an assembled state; and
a cover member covering the charging port, wherein
the movable member is supported by the component body, and
the charging port is disposed closer to the internal space than the wireless communication device.
2. The electric bicycle component according to claim 1, further comprising:

a charging controller mounted to the component body and configured to control a charging voltage inputted via the charging port to the rechargeable power supply device.

3. The electric bicycle component according to claim 1, wherein
the wireless communication device includes a wireless receiver configured to wirelessly receive a signal from the additional bicycle component, and
the rechargeable power supply device is configured to supply the electrical power to the wireless receiver.

4. The electric bicycle component according to claim 1, further comprising:
an actuator configured to convert the electrical power to an actuating force, wherein
the rechargeable power supply device is configured to supply the electrical power to the actuator.

5. The electric bicycle component according to claim 4, wherein
the movable member is configured to be actuated by the actuating force from the actuator.

6. The electric bicycle component according to claim 5, wherein
the movable member includes a chain guide configured to guide a bicycle chain to change speed stages of a bicycle.

7. The electric bicycle component according to claim 1, further comprising:
a signal controller configured to generate a signal, wherein
the wireless communication device includes a wireless transmitter configured to wirelessly transmit the signal, and
the rechargeable power supply device is configured to supply the electrical power to the signal controller.

8. The electric bicycle component according to claim 7, wherein
the rechargeable power supply device comprises a rechargeable battery,
the signal controller is configured to generate a battery level signal indicating a battery level of the rechargeable battery, and
the wireless transmitter is configured to wirelessly transmit the battery level signal.

9. The electric bicycle component according to claim 7, wherein
the movable member includes a chain guide configured to guide a bicycle chain to change speed stages of a bicycle,
the signal controller is configured to generate a current speed stage signal indicating a current speed stage of the bicycle, and
the wireless transmitter is configured to wirelessly transmit the current speed stage signal.

10. The electric bicycle component according to claim 1, further comprising:
a seal member configured to be attached to at least one of the cover member and the charging port.

11. The electric bicycle component according to claim 1, wherein
the wireless communication device is provided on the component body.

12. The electric bicycle component according to claim 1, wherein
the cover member extends within the hole.

13. An electric bicycle component comprising:
a wireless communication device configured to wirelessly communicate with an additional bicycle component;
a rechargeable power supply device configured to supply electrical power to the wireless communication device;
a movable member configured to be actuated by the electrical power supplied from the rechargeable power supply device; and
a component body configured to be mounted to a bicycle body, the component body having a battery holder in which the rechargeable power supply device is to be detachably provided, the battery holder having an opening provided on an outer peripheral surface of the component body when the electric bicycle component is in an assembled state, the battery holder having a lid configured to cover the opening, the component body having a charging port via which the rechargeable power supply device is to be charged, wherein
the rechargeable power supply device comprises a rechargeable battery configured to be removably provided in the battery holder,
the charging port is provided on the outer peripheral surface of the component body when the electric bicycle component is in an assembled state,
the movable member is supported by the component body,
the battery holder includes an electrical terminal configured to be in contact with a terminal of the rechargeable battery in a state where the rechargeable battery is provided in the battery holder, and
the electrical terminal being provided on the lid.

14. The electric bicycle component according to claim 13, further comprising:
a charging controller mounted to the component body and configured to control a charging voltage inputted via the charging port to the rechargeable power supply device.

15. The electric bicycle component according to claim 13, wherein
the wireless communication device is provided on the component body.

16. The electric bicycle component according to claim 13, wherein
the lid extends flush with the outer peripheral surface of the component body when the lid covers the opening.

* * * * *